(12) United States Patent
Holgersson et al.

(10) Patent No.: US 11,221,628 B2
(45) Date of Patent: Jan. 11, 2022

(54) WORK AREA MARKING FOR A ROBOTIC WORKING TOOL

(71) Applicant: HUSQVARNA AB, Huskvarna (SE)

(72) Inventors: Jonas Holgersson, Huskvarna (SE); Mattias Kamfors, Jönköping (SE); Stefan Bergström, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 36 days.

(21) Appl. No.: 16/640,428

(22) PCT Filed: Aug. 14, 2018

(86) PCT No.: PCT/SE2018/050819
§ 371 (c)(1),
(2) Date: Feb. 20, 2020

(87) PCT Pub. No.: WO2019/039985
PCT Pub. Date: Feb. 28, 2019

(65) Prior Publication Data
US 2020/0356110 A1   Nov. 12, 2020

(30) Foreign Application Priority Data
Aug. 23, 2017 (SE) .................................. 1751012-4

(51) Int. Cl.
G05D 1/02 (2020.01)
A01D 34/00 (2006.01)
A01D 101/00 (2006.01)

(52) U.S. Cl.
CPC ......... *G05D 1/0265* (2013.01); *A01D 34/008* (2013.01); *A01D 2101/00* (2013.01); *G05D 2201/0208* (2013.01)

(58) Field of Classification Search
CPC ......... G05D 1/0265; G05D 2201/0208; A01D 34/008; A01D 2102/00
See application file for complete search history.

(56) References Cited

U.S. PATENT DOCUMENTS 6,465,982 B1  10/2002  Bergvall et al.
7,613,543 B2 * 11/2009  Petersson ............. A01D 34/008
                                                      180/167
(Continued)

FOREIGN PATENT DOCUMENTS

EP          3257349 A1   12/2017
WO     2013/177919 A1   12/2013

OTHER PUBLICATIONS

Swedish Search Report for Application No. 1751012-4 dated Apr. 13, 2018.

(Continued)

*Primary Examiner* — Nicholas Kiswanto
(74) *Attorney, Agent, or Firm* — Burr & Forman, LLP

(57) ABSTRACT

A robotic work tool (100) comprising a controller (110) and at least one magnetic sensor (170) arranged to sense a magnetic boundary signal emitted by a boundary wire, and a first magnetic guide signal emitted by a first guide wire (261), wherein the controller (110) is configured to: detect an at least partial crossing of the first guide wire (261) from a first work zone to a second work zone, determine an operating status and if the operating status indicates that a crossing is allowed, allow the robotic work tool to cross the first guide wire (261) to the second work zone, and if not, control the operation of the robotic work tool so that the first guide wire (261) is not crossed.

16 Claims, 5 Drawing Sheets

(56) References Cited

U.S. PATENT DOCUMENTS

| | | | |
|---|---|---|---|
| 9,740,210 B2* | 8/2017 | Sjoholm | G05D 1/0265 |
| 10,444,756 B2* | 10/2019 | Kamfors | G05D 1/0278 |
| 2003/0023356 A1 | 1/2003 | Keable | |
| 2005/0230166 A1 | 10/2005 | Petersson et al. | |
| 2011/0202307 A1* | 8/2011 | Petereit | A01D 34/008 |
| | | | 702/150 |
| 2011/0295423 A1 | 12/2011 | Anderson | |
| 2013/0211648 A1 | 8/2013 | Yamamura et al. | |
| 2014/0054099 A1 | 2/2014 | Ho et al. | |
| 2014/0222197 A1* | 8/2014 | Letsky | G05D 1/0274 |
| | | | 700/245 |
| 2014/0379196 A1 | 12/2014 | Da Rocha et al. | |
| 2016/0174459 A1 | 6/2016 | Balutis et al. | |
| 2017/0150676 A1 | 6/2017 | Yamauchi et al. | |
| 2020/0042011 A1* | 2/2020 | Arlig | G05D 1/0265 |

OTHER PUBLICATIONS

International Search Report and Written Opinion for International Application No. PCT/SE2018/050819 dated Oct. 15, 2018.

* cited by examiner

WORK AREA MARKING FOR A ROBOTIC WORKING TOOL

TECHNICAL FIELD

This application relates to robotic working tools and in particular to a robotic working tool, a robotic working tool system, a computer readable medium and a method for improved work area marking by a robotic working tool, such as a lawnmower.

BACKGROUND

Automated or robotic power tools such as robotic lawnmowers are becoming increasingly more popular. In a typical deployment, as is depicted in FIG. 1 showing a traditional robotic working tool system, a robotic working tool 100 is set to operate in a work area 205 following its internal navigation routine. Traditionally the perimeter of this work area 205 is marked by a boundary wire 250 through which an electrical signal 245 is transmitted. As the signal travels through the boundary wire 250 it will generate a magnetic field around the boundary wire 250, which the robotic working tool 100 may detect using a magnetic field sensor, such as a coil with a magnetic core. In such an arrangement the robotic working tool 100 may be kept within the work area 205 by being programmed to turn as the magnetic field caused by the signal 245 is detected, either to exceed a threshold (indicating a closeness to the boundary wire) or to change polarity (indicating a cable crossing) or a combination of the two.

Such a system works satisfactorily when only one work area is to be marked, but has one weakness in that if the boundary wire is laid out so that it encompasses a partial area or zone 205' which is only accessible by a narrow corridor 205".

To enable the robotic work tool 100 to find its way into the work zone 205', prior art systems teach to use a guide wire 260 which the robotic work tool 100 can follow to enter or exit through the channel 205". To enable the robotic work tool to detect the guide cable (and differentiate it from the boundary wire), a guide control signal 246 may be transmitted through the guide cable 260, where the guide control cable 246 is different from the control signal 245.

As noted above, such systems function satisfactorily when only one work area is to be defined, but if a work area is to be divided into different zones—as the inventors have realized—the system suffers and requires that several boundary wires are used, one for each zone. One example system is that of US 2005/0230166 A1. Furthermore, several guide cables may be necessary to enable the robotic work tool to enter and/or exit the zone if it has a narrow opening.

The solution that is provided for by the prior art is to use supplemental navigation means, such as Global Positioning Systems or rely on deduced reckoning and navigate according to a map. However, such systems are costly and require that a detailed map is provided. Furthermore, they do not function in all areas as they require a good satellite reception, which may not be available in areas with a great deal of foliage.

There is thus a need for a robotic working tool system that is able to provide for a plurality of working zones without requiring a multitude of wires or supplemental navigation aids.

SUMMARY

It is therefore an object of the teachings of this application to overcome or at least reduce those problems and problems discussed above and below by providing a robotic work tool comprising a controller and at least one magnetic sensor arranged to sense a magnetic boundary signal emitted by a boundary wire, and a first magnetic guide signal emitted by a first guide wire, wherein the boundary wire is arranged to demarcate a work area and the guide wire is arranged to at least partially demarcate at least a first and a second work zone, wherein the first work zone and the second work zone are both comprised in the work area, wherein the controller is configured to: detect an at least partial crossing of the first guide wire from a first work zone to a second work zone, determine an operating status, the operating status indicating whether the first guide wire may be crossed to enter the second work zone, and if the operating status indicates that a crossing is allowed, allow the robotic work tool to cross the first guide wire to the second work zone, and if not, control the operation of the robotic work tool so that the first guide wire is not crossed.

This enables the forming of different work zones simply by using a guide wire that is laid out in a clever manner.

This is a very simple solution to a long standing problem, that in some embodiments require only a minimum of modification to the contemporary robotic working tools.

The inventors have thus provided a highly simple and elegant solution to a long-standing problem as per the teachings herein by providing a robotic working tool system comprising a boundary wire and a first guide wire, where the first guide wire is arranged to be laid in so that it partially follows the boundary wire, extending at least partially into a work area bounded by the boundary wire when not following the boundary wire so that a first work zone is formed on one side of the first guide wire and a second work zone is formed on another side of the first guide wire. It is also an object of the teachings of this application to overcome the problems by providing a method for use in a robotic work tool comprising at least one magnetic sensor arranged to sense a magnetic signal emitted by a boundary wire and a first magnetic signal emitted by first guide wire, wherein the boundary wire is arranged to demarcate a work area and the guide wire is arranged to at least partially demarcate at least a first and a second work zone, wherein the first work zone and the second work zone are both comprised in the work area, wherein the method comprises: detecting an at least partial crossing of the first guide wire from a first work zone to a second work zone, determining an operating status, the operating status indicating whether the first guide wire may be crossed to enter the second work zone, and if the operating status indicates that a crossing is allowed, allowing the robotic work tool to cross the first guide wire to the second work zone, and if not, controlling the operation of the robotic work tool so that the first guide wire is not crossed.

It is also an object of the teachings of this application to overcome the problems by providing a computer readable medium for carrying computer instructions that when loaded into a controller of a robotic working tool or robotic working tool system, causes the robotic working tool or robotic working tool system to operate according to a method as above and herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

Figure 1:
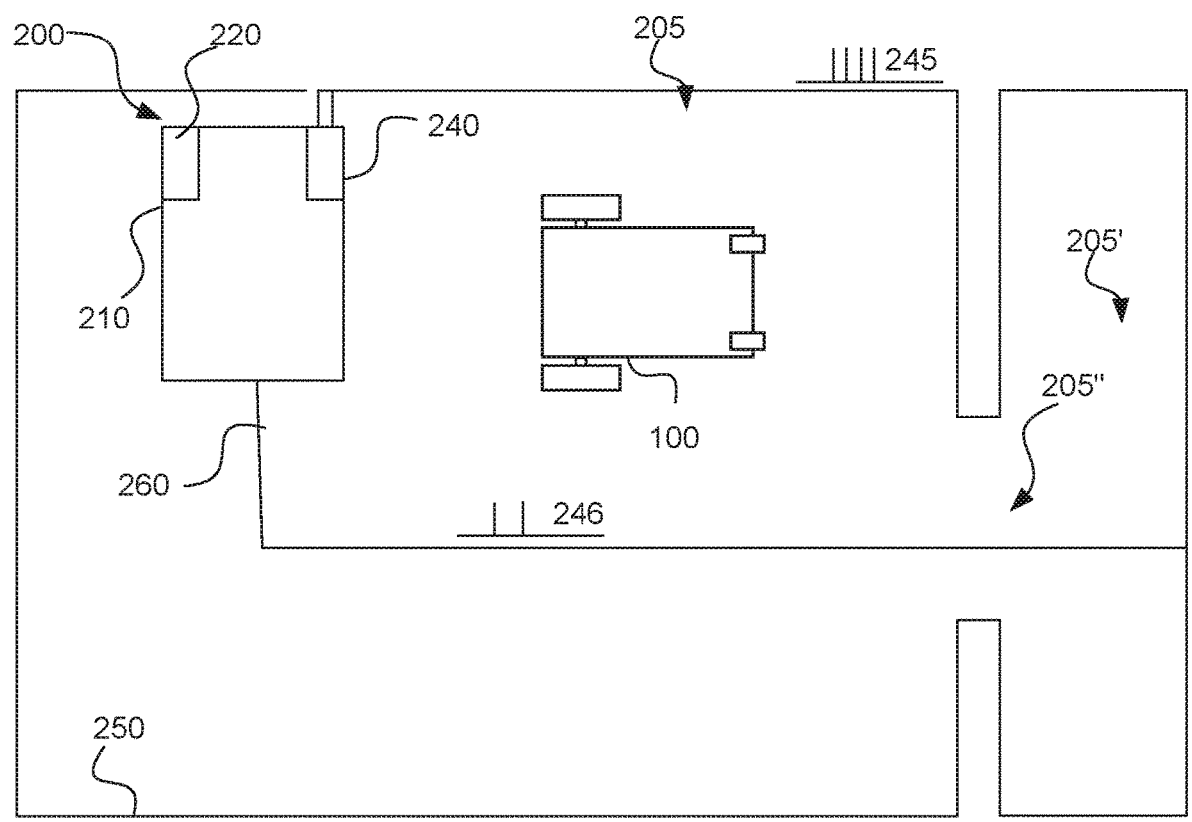
FIG. 1 shows an example of a robotic lawnmower system according to the prior art.

Returning to FIG. 1 showing a schematic view of a robotic working tool system 200. The schematic view is not to scale. Although FIG. 1 is aimed to show an example of prior art systems, many of the components of such a system are common to a system of the teachings according herein and the differences will be detailed with reference to FIGS. 2A, 2B and 3.

As stated in the background section, the robotic working tool system 200 comprises a charging station 210 and a boundary wire or cable 250 arranged to enclose a work area 205, in which the robotic lawnmower 100 is supposed to operate.

The robotic working tool 100 is exemplified by a robotic lawnmower, but the teachings herein may also be applied to other robotic working tools adapted to operate within a work area.

The charging station 210 has a charger 220, in this embodiment coupled to two charging plates. The charging plates are arranged to co-operate with corresponding charging plates of the robotic lawnmower 100 for charging a battery (referenced 180 in FIG. 2B) of the robotic lawnmower 100.

The charging station 210 also has, or may be coupled to, a signal generator 240 for providing a control signal 245 to be transmitted through the boundary wire 250. The signal generator 240 thus comprises a controller for generating the control signal.

In one embodiment the control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal 245 may also or alternatively be a continuous sinusoidal wave.

As is known in the art, the current signal will generate a magnetic field around the boundary wire 250 which sensors (referenced 170 in FIG. 2B) of the robotic lawnmower 100 will detect.

For the context of this application detecting a signal will include, but not be limited to, detecting the magnetic field generated by the signal as it travels through a wire by receiving the voltages generated by the sensor as it is exposed to the magnetic field and processing these voltages in order to identify them as having been generated by the signal. For example a pulsed signal will give rise to a series of voltage flanks that may be identified as corresponding to the pulsed signal, by the flanks relative time distances.

As the robotic lawnmower 100 (or more accurately, the sensor referenced 170 in FIG. 2B) crosses the boundary wire 250 the direction of the magnetic field will change, the polarity will change. The robotic lawnmower 100 will thus be able to determine that the boundary wire has been crossed, and take appropriate action by controlling the driving of the rear wheels 130" to cause the robotic lawnmower 100 to turn a certain angular amount and return into the work area 205, or alternatively, reverse into the work area and then turn.

The robotic work tool 100 may also be arranged to determine that a crossing is eminent by determining that the received magnetic field is received at an amplitude exceeding a threshold value.

For its operation within the work area 205, in the embodiment of FIG. 1, the robotic lawnmower 100 may alternatively or additionally use a satellite navigation device, possibly supported by a deduced reckoning navigation sensor to navigate the work area 205.

The robotic working tool system 200 also comprises at least one further cable or wire, namely a guide wire 260 for enabling the robotic working tool 100 to find the charging station more quickly (than having to randomly find it or simply follow the boundary wire 250). To enable the robotic working tool 100 to differentiate the additional wire(s) 260 from the boundary wire, a different signal 246 may be transmitted through the additional wire(s) 260.

Figure 2A:
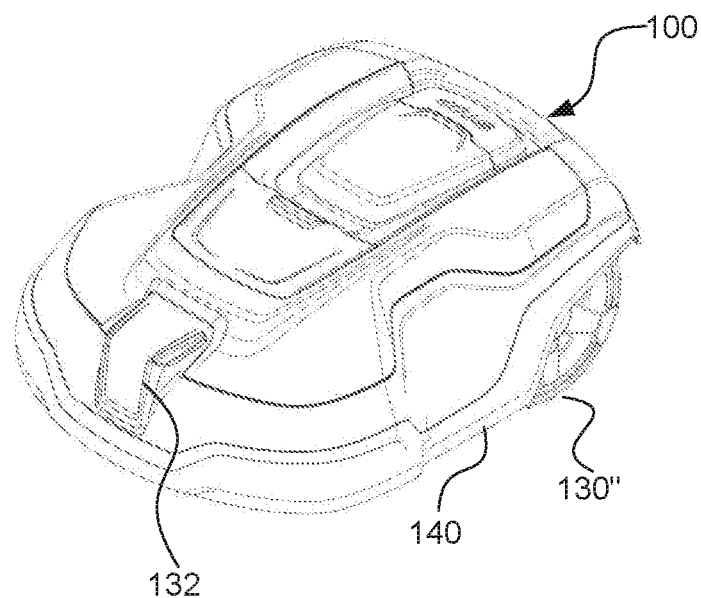
FIG. 2A shows an example of a robotic lawnmower according to an embodiment of the teachings herein.

FIG. 2A shows a perspective view of a robotic working tool 100, here exemplified by a robotic lawnmower 100, having a body comprising a cover 132 and a chassis 140 and a plurality of wheels 130 (only one shown). As can be seen, the robotic lawnmower 100 may comprise charging skids for contacting contact plates when docking into a charging station (not shown in FIG. 2A, but referenced 210 in FIGS. 1 and 3) for receiving a charging current through, and possibly also for transferring information by means of electrical communication between the charging station and the robotic lawnmower 100.

Figure 2B:
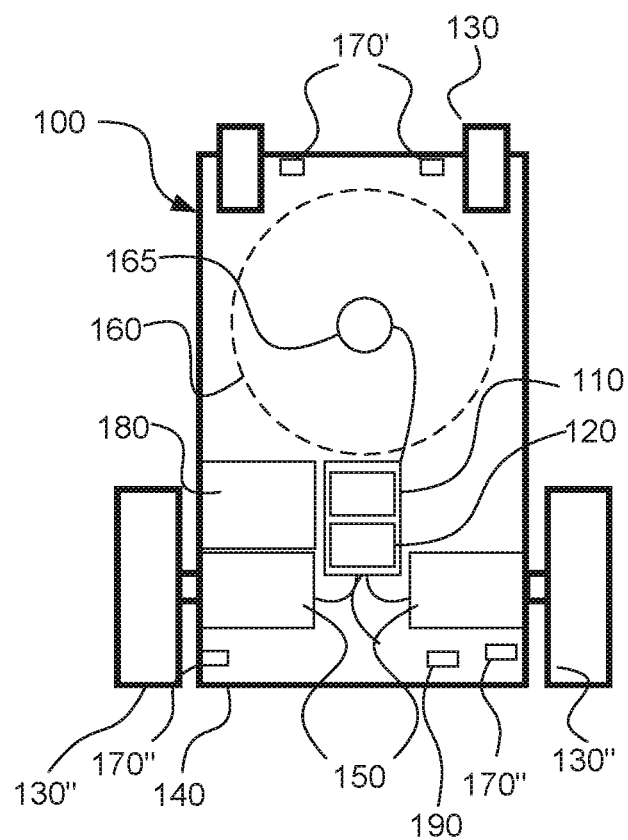
FIG. 2B shows a schematic view of the components of an example of a robotic lawnmower according to an embodiment of the teachings herein.

FIG. 2B shows a schematic overview of the robotic working tool 100, also exemplified here by a robotic lawnmower 100, having a chassis 140 and a plurality of wheels 130.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, or other robotic working tools to be employed in a work area defined by a boundary wire.

In the exemplary embodiment of FIG. 2B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 2B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 further has at least one sensor 170; in the example of FIG. 2B there are four sensors divided into a first sensor pair 170' and a second sensor pair 170", respectively arranged at each wheel 130', 130" to detect a magnetic field (not shown) and for detecting a boundary wire and/or for receiving (and possibly also sending) information from a signal generator 240. The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary wire. This enables the controller 110 to determine whether the robotic lawnmower 100 is close to or crossing a boundary wire 250, or inside or outside an area enclosed by the boundary wire 250. This also enables the robotic lawnmower 100 to receive, and possibly send, information from/to the control signal 245.

The robotic lawnmower 100 also comprises a grass cutting device 160, such as a rotating blade 160 driven by a cutter motor 165. The grass cutting device being an example of a work tool 160 for a robotic working tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

Figure 3A:
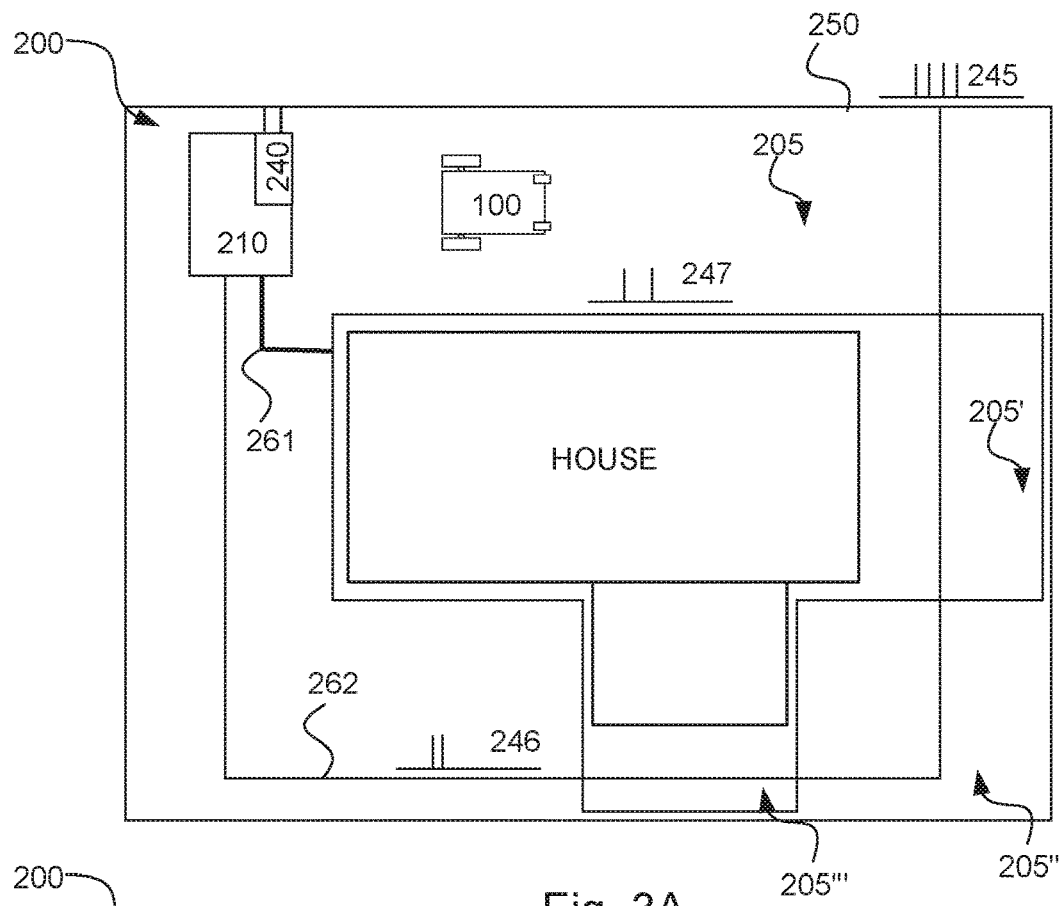
FIGS. 3A and 3B each shows a schematic overview of a robotic lawnmower system according to an embodiment of the teachings herein.

FIG. 3A shows a schematic view of a robotic working tool system 200 in one embodiment according to the teachings herein. It should be noted that the system according to the teachings include many of the components of the prior art system and for clarity's sake, some components will not be shown in FIG. 3A, such as the charger 220. The schematic view is not to scale. As in the prior art, the robotic working tool system 200 comprises a charging station 210 and a boundary wire 250 arranged to enclose a work area 205, in which the robotic lawnmower 100 is supposed to operate.

However, the inventors have realised by inventive and insightful reasoning, that the work area 205 may be divided into a clever manner into several zones by utilizing two guide wires, a first guide wire 261 and a second guide wire 262. Each guide wire 261, 262 is provided with a guide control signal of its own 246 and 247 respectively. To enable the robotic work tool 100 to differentiate between the control signals, they all differ from one another, as is also illustrated in FIG. 3A.

The first guide wire 261 is utilized as a second boundary wire to delimit at least one zone. In one embodiment the first guide wire 261 is laid out in a manner where it follows borders of the work area 205, such as walls (of houses for example) or the boundary wire 250. By laying the first guide wire 261 in a loop and making sure that the exit follows the entry to the charging station, i.e. the first guide wire is laid adjacent itself when entering and exiting the charging station, the signal in the first guide wire will cancel itself and the first guide wire will not be detected at such transitions. Alternatively, the first guide wire may exit and enter the charging station along the boundary wire 250, whereby it will also not affect the operation of the robotic work tool.

By laying the first guide wire so that it alternates between following the boundary wire 250 and obstacles (such as the house), the first guide wire effectively delimits zones of the work area 205. In the example embodiment of FIG. 3A, three additional zones are delimited 205', 205" and 205'" respectively, providing a total of three operating or work zones, or four if one counts the remainder of the work area 205 as one zone. The work area 205 thus comprises one or more work zones, wherein each work zone is bounded by the boundary wire and at least one guide cable, thereby utilizing the guide cables to also act as boundary wires, at least on a partial section of the guide cable.

To enable the robotic work tool 100 to find its way into and out of a work zone 205', 205", 205'", the second guide wire 262 may be used. In such an embodiment, the second guide wire 262 is laid so that it at least crosses the first guide wire, preferably at a positions where it is easy or at least possible for the robotic work tool 100 to enter/exit the zone. In the example of FIG. 3A, the second guide wire is laid so that it enters and exits all three work zones 205', 205" and 205". The second guide wire 262 may also be used by the robotic work tool 100 to find the first guide wire 261.

It should be noted that the use of the second guide wire 262 is optional, and the definition of multiple work zones using only one wire is made possible by the clever laying of the first guide wire 261.

As the first guide wire 261 is laid along a perimeter or boundary of the work area 205, apart from when it transitions from an obstacle boundary to the boundary wire (or vice versa), the robotic work tool 100 will not be able to escape the work are 205 by simply crossing the first guide wire 261 as the boundary wire 250 or an obstacle boundary (such as a house) will prevent the robotic work tool 100 from escaping the work area 205.

Viewing the example of FIG. 3A, the first guide wire 261, acting as a second boundary wire, is laid along one wall of the house. At a corner of the house, the first guide wire 261 is laid so that it transitions or crosses the work area 205 from the house to the boundary wire 250. The first guide wire 261 is laid so that it follows the boundary wire 250 for a distance, after which the first guide wire 261 again transitions the work area 205 back to the house. A first work zone 205' has thereby been defined. Similarly a second work zone 205" and a third work zone 205'" are also defined.

As the robotic work tool 100 encounters or detects that it is about to cross the first guide wire 261, it is configured to determine a current operating status. The operating status indicates the current objective of the robotic work tool 100 with regards to the first guide wire, namely whether the guide wire is used as a guide wire or to demarcate a work zone, and also to indicate whether a switch from one work zone to another should be made. The operating status may indicate that the first guide wire may be crossed, to enable entry into (or out of) a work zone. In such case, the robotic work tool 100 will cross the first guide wire 261 and enter or exit the corresponding work zone. The operating status may indicate that the first guide wire may be crossed only when following the second guide wire, enabling for a controlled entry/exit of a work zone.

If the operating status indicates that the first guide wire may be crossed, and in an instance where the robotic work tool is following the second guide wire, the robotic work tool may, in one embodiment, be configured to stop following the second guide wire as the first guide wire has been crossed.

The operating status may indicate that the first guide wire may not be crossed. In such case, the robotic work tool 100 will not cross the first guide wire 261 and remain within the current work zone. The operating status may indicate that a work zone should be bypassed. In such case, the robotic work tool 100 will follow the first guide wire 261, possibly until it (again) reaches the second guide wire 262 whereby the robotic work tool will remove itself from the first guide wire 261, i.e. stop following the first guide wire 261. A work zone may thus be bypassed. In one such embodiment, the robotic work tool removes itself from the first guide wire 261 by following the second guide wire 262, at least for a while, possibly approximately 0.3, 0.5, 0.7 or 1 meter or 1, 2, 3, 4, or 5 seconds away from the first guide wire and the work zone.

The robotic work tool may also or alternatively be configured to follow the first guide wire until it (again) reaches the second guide wire 262 whereby the robotic work tool will remove itself from the first guide wire 261, i.e. stop following the first guide wire 261, but to enter the work zone along the second guide wire. A work zone may thus be entered in a controlled manner.

In one embodiment the operating status is based on a categorization of a work zone. The corresponding work zone may be identified through a counter counting the order of encountered work zones when following the second guide wire. The corresponding work zone may alternatively or additionally be identified through use of supplemental navigation means. The categorization may indicate whether a zone should be entered or not or whether it should be simply by passed. This allows for defining "no go" zones, keep out zones and zones that should simply be bypassed. In one embodiment the operating status is based on a time spent in the current work zone. This enables the robotic work tool to remain within a work zone for at least a minimum time to ensure that the zone is operated on sufficiently. In one embodiment the operating status is based on an operating time. This enables a timed control of the operation of the robotic work tool, in that a zone is only entered after sufficient time has been spent outside it. In one embodiment the operating status is based on a time of day. This enables a scheduling of the robotic work tool's work.

Figure 3B:
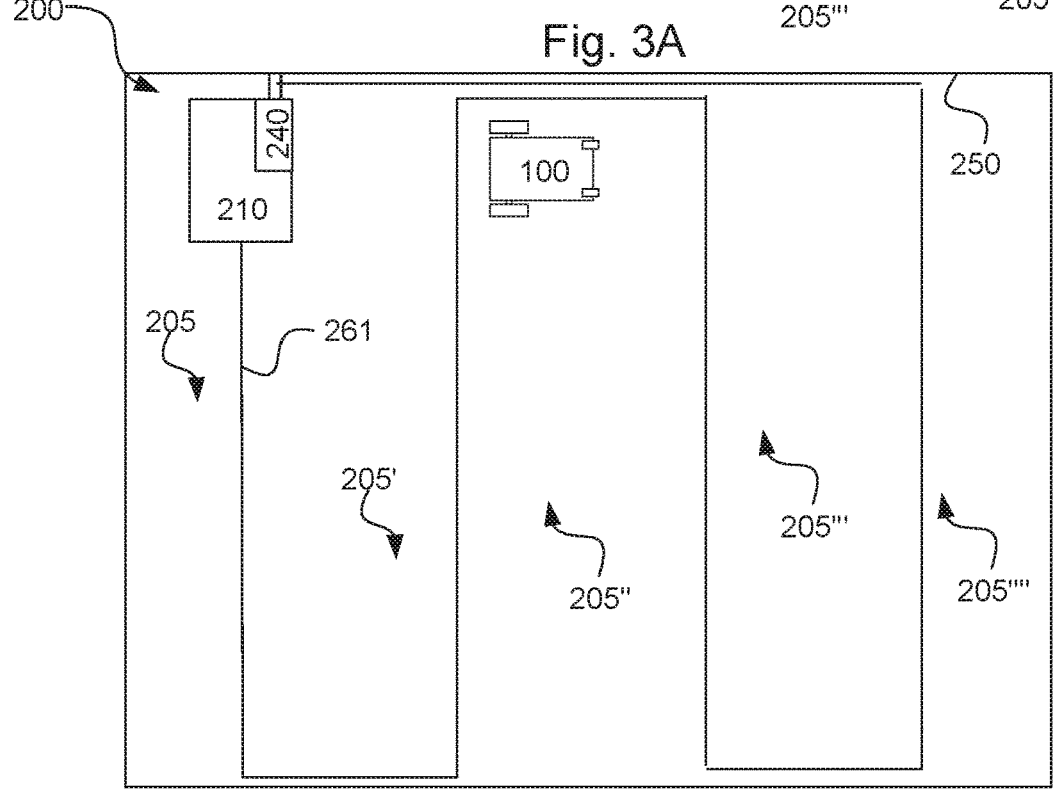

It should be noted that the first guide wire 261 may alternatively or additionally be laid so that it crosses from one side portion of the boundary wire 250 to another portion of the boundary cable. An example is shown in FIG. 3B, where a plurality of work zones 205 have been defined using a single guide wire 262.

Returning to the use of a second guide wire for finding the work zones, if the first and second guide wires are laid so that they cross each other and a crossing of the first guide wire is only allowed along the second guide wire a more precise control of the robotic work tool's crossing from one zone to another may be achieved.

In one embodiment, the robotic work tool may be configured to follow the boundary wire to find a work zone. In such an embodiment, the controller 110 of the robotic work tool 100 is configured to control the operation of the robotic work tool to follow the boundary wire 250 to search for the first guide wire 261. In one embodiment, the robotic work tool may be configured to receive a position through a navigation system, such as a global positioning system, and navigate according to such position data to search for the first guide wire 261. In such an embodiment, the controller 110 of the robotic work tool 100 is configured to control the operation of the robotic work tool to navigate according to navigation system data, such as GPS data, to search for the first guide wire 261. In such an embodiment, a GPS sensor is comprised in the robotic work tool. Possibly as part of a navigation sensor 190 which may also or alternatively comprise deduced reckoning means, such as odometers and/or a compass. In such an embodiment, the gist of the invention is still utilized, namely to enable different work zones to be formed simply by using an extra guide wire.

Figure 4:
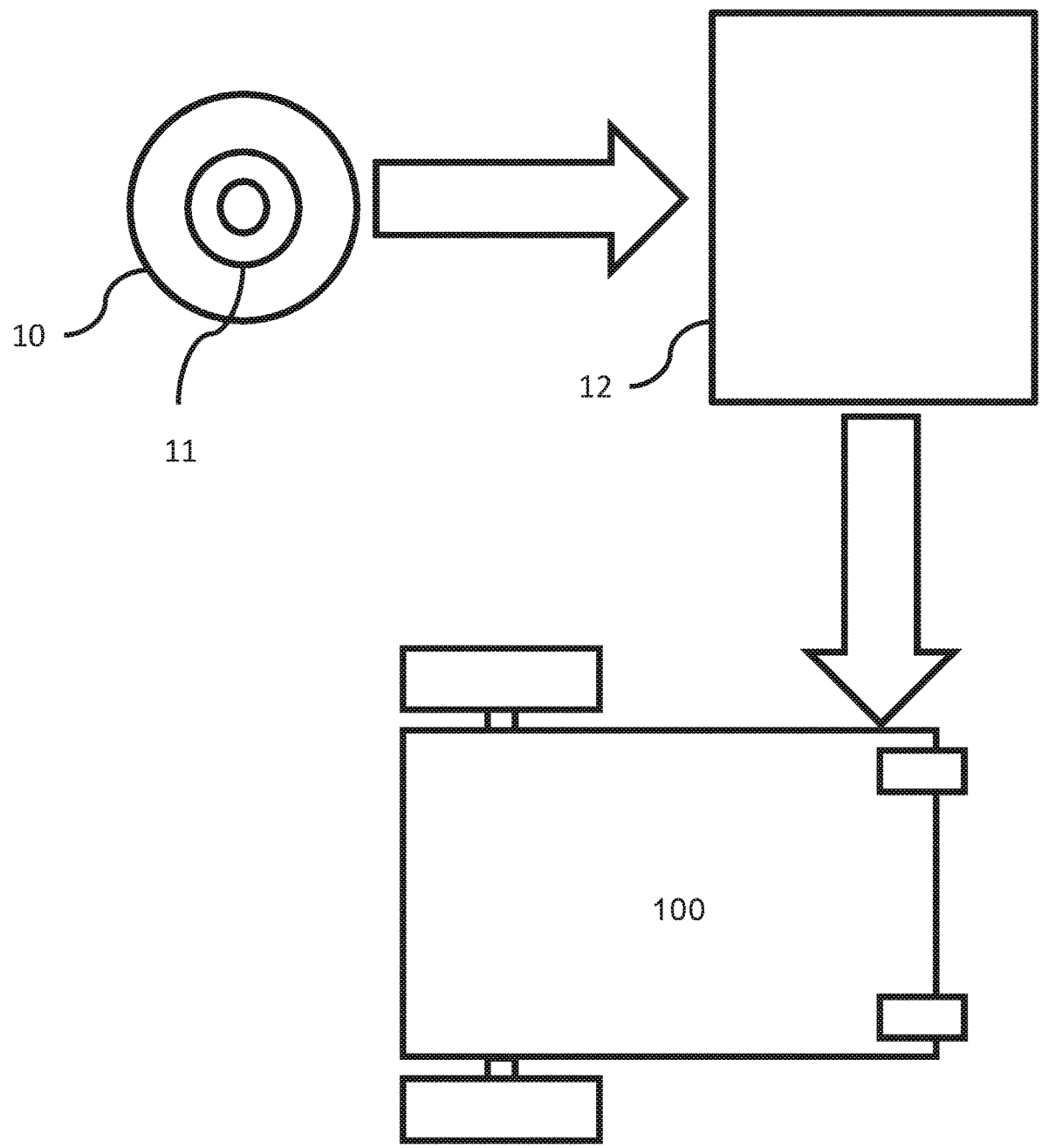
FIG. 4 shows a schematic view of a computer-readable medium carrying computer instructions according to an example embodiment of the teachings herein.

It should be noted that as the robotic working tool 100 already includes all or at least most hardware components necessary to detect and operate according to multiple control signals, a simple software update may be sufficient to adapt an existing robotic working tool 100 to operate according to the teachings herein. Such software update may be provided by loading a set of computer instructions into the controller of the robotic working tool 100. Such computer instructions may be carried by a computer readable medium as shown in FIG. 4, which shows a schematic view of a computer-readable product 10 according to one embodiment of the teachings herein. The computer-readable product is configured to carry or store a computer program or computer program instructions 11 along with application related data. The computer-readable product 10 may be a data disc as in FIG. 4 or a Universal Serial Bus, a memory card or other commonly known computer readable products, these being examples of transitory mediums. The computer-readable product 10 may be inserted or plugged in or otherwise connected to a computer-readable product reader 12 configured to read the information, such as the program instructions 11 stored on the computer-readable product 12 and possibly execute the instructions or to connect to a device configured to execute the instructions such as a robotic working tool 100, as the one disclosed in FIGS. 2A and 2B. The robotic working tool 100 may thus connect wirelessly or through a wired connection to a computer-readable product reader 12 (this being an example of a non-transitory medium) to receive the computer instructions 11. The robotic working tool 100 may in one embodiment comprise the computer-readable product reader 12 to receive the computer instructions 11.

Figure 5:
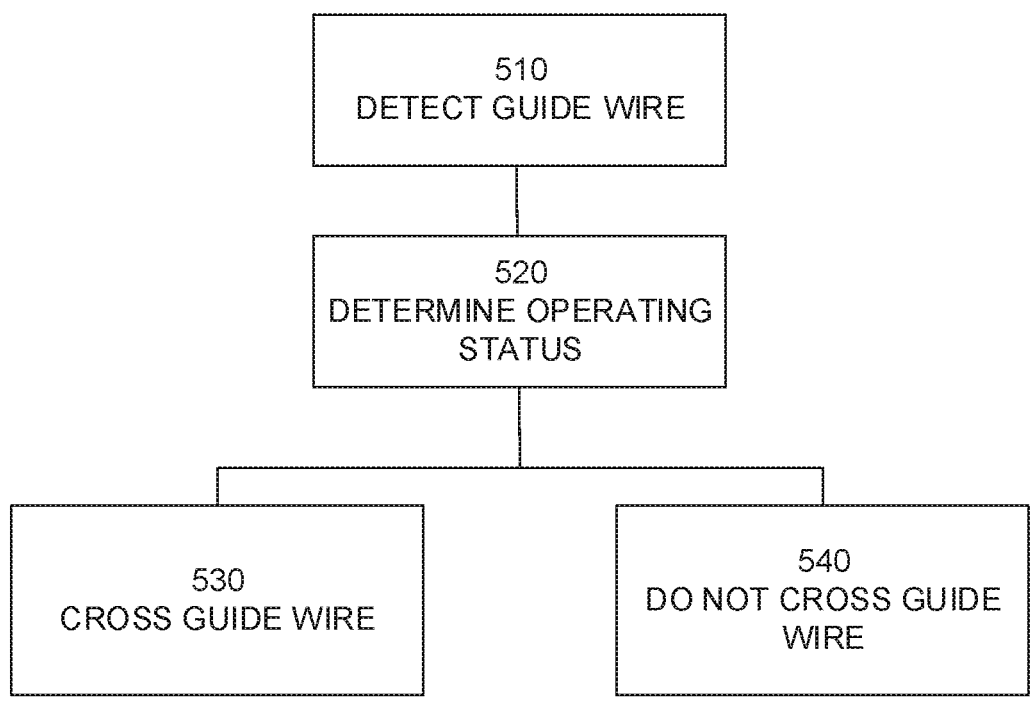
FIG. 5 shows a flowchart for a method for a robotic working tool according to an example embodiment of the teachings herein.

When loaded into and executed by a controller the computer instructions may cause the robotic working tool 100 to operate according to a method as shown in FIG. 5 which shows a flowchart for a general method for a robotic working tool according to herein The robotic working tool 100 is thus configured to perform a method comprising detecting 510 a first guide wire 261, and then determining 520 an operating status and if the operating status indicates that a crossing is allowed, allowing the robotic work tool to cross 530 the first guide wire 261 to the second work zone, and if not, controlling 540 the operation of the robotic work tool so that the first guide wire 261 is not crossed.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool comprising:
a controller; and
at least one magnetic sensor arranged to sense a magnetic boundary signal emitted by a boundary wire, and a first magnetic guide signal emitted by a first guide wire,
wherein the boundary wire is arranged to demarcate a work area, and
the first guide wire is arranged to at least partially demarcate at least a first work zone and a second work zone, wherein the first work zone and the second work zone are both comprised in the work area,
wherein the controller is configured to:
detect an at least partial crossing of the first guide wire from the first work zone to the second work zone;
determine an operating status, the operating status indicating whether a crossing of the first guide wire to enter the second work zone is allowed, and
if the operating status indicates that the crossing is allowed, allow the robotic work tool to cross the first guide wire to the second work zone, and if not, control operation of the robotic work tool so that the first guide wire is not crossed;
wherein the at least one magnetic sensor is further arranged to sense a second magnetic guide signal emitted by a second guide wire and the controller is further configured to control the operation of the robotic work tool to:
follow the second guide wire to search for the first guide wire,
follow the second guide wire during a crossing of the first guide wire,
stop following the second guide wire as the first guide wire has been crossed, or
only allow a crossing of the first guide wire when the robotic work tool is following the second guide wire.

2. The robotic work tool according to claim 1, wherein the controller is configured to control the operation of the robotic work tool so that the first guide wire is not crossed by following the first guide wire at least partially around the second work zone, whereby the controller controls the robotic work tool to stop following the first guide wire.

3. The robotic work tool according to claim 2, wherein the controller is configured to control the operation of the robotic work tool so that the first guide wire is not crossed by following the first guide wire at least partially around the second work zone until the second guide wire is detected, whereby the controller controls the robotic work tool to again follow the second guide wire away from the second work zone.

4. The robotic work tool according to claim 2, wherein the controller is configured to control the operation of the robotic work tool so that the first guide wire is not crossed by following the first guide wire at least partially around the second work zone until the second guide wire is detected, whereby the controller controls the robotic work tool to again follow the second guide wire into the second work zone.

5. The robotic work tool according to claim 1, wherein the controller is further configured to control the operation of the robotic work tool to follow the boundary wire to search for the first guide wire.

6. The robotic work tool according to claim 1, wherein the controller is further configured to control the operation of the robotic work tool to navigate according to navigation system data, to search for the first guide wire.

7. The robotic work tool according to claim 1, wherein the operating status is based on a categorization of the second work zone,
wherein the operating status is based on a time spent in the first work zone,
wherein the operating status is based on an operating time, or
wherein the operating status is based on a time of day.

8. The robotic work tool according to claim 1, wherein the first magnetic guide signal corresponds to a current signal being propagated through the first guide wire, the first magnetic guide signal being generated by the current signal as the current signal propagates through the boundary wire.

9. The robotic work tool according to claim 1, wherein the controller is configured to detect the first guide wire by detecting a crossing of the first guide wire, or
wherein the controller is configured to detect the first guide wire by detecting that the corresponding received first magnetic guide signal exceeds a threshold value.

10. The robotic work tool according to claim 1, wherein the robotic work tool comprises at least two magnetic sensors and wherein the controller is configured to follow the second guide wire by controlling the operation of the robotic work tool so that a first of the at least two magnetic sensors detects a magnetic signal associated with the second guide wire being followed at a first polarity and a second of the at least two magnetic sensors detects the magnetic signal associated with the second guide wire being followed at a second polarity.

11. The robotic work tool according to claim 1, wherein the controller is configured to follow the first guide wire by controlling the operation of the robotic work tool so that a first of the at least one magnetic sensors detects a magnetic signal associated with the first guide wire being followed at a maintained first amplitude.

12. The robotic work tool according to claim 1, wherein the controller is configured to detect an at least partial crossing of the second guide wire from the first work zone to the second work zone, by detecting a change in polarity that a first magnetic sensor of the at least one magnetic sensor detects a magnetic signal associated with the second guide wire while being followed.

13. A robotic work tool system comprising:
a robotic work tool according to claim 1,
the boundary wire; and
the first guide wire,
wherein the first guide wire is arranged to be laid in so that the first guide wire partially follows the boundary wire, extending at least partially into a work area bounded by the boundary wire when not following the boundary wire so that the first work zone is formed on one side of the first guide wire and the second work zone is formed on another side of the first guide wire.

14. A robotic work tool comprising:
a controller; and
at least one magnetic sensor arranged to sense a magnetic boundary signal emitted by a boundary wire, and a first magnetic guide signal emitted by a first guide wire,
wherein the boundary wire is arranged to demarcate a work area and
the first guide wire is arranged to at least partially demarcate at least a first work zone and a second work zone, wherein the first work zone and the second work zone are both comprised in the work area,
wherein the controller is configured to:
detect an at least partial crossing of the first guide wire from the first work zone to the second work zone;
determine an operating status, the operating status indicating whether a crossing of the first guide wire to enter the second work zone is allowed, and
if the operating status indicates that the crossing is allowed, allow the robotic work tool to cross the first guide wire to the second work zone, and if not, control operation of the robotic work tool so that the first guide wire is not crossed;
wherein the controller is configured to control the operation of the robotic work tool so that the first guide wire is not crossed by returning the robotic work tool to the first work zone.

15. A method for use in a robotic work tool comprising at least one magnetic sensor arranged to sense a magnetic signal emitted by a boundary wire and a first magnetic signal emitted by a first guide wire and sense a second magnetic guide signal emitted by a second guide wire,
wherein the boundary wire is arranged to demarcate a work area, and
the guide wire is arranged to at least partially demarcate at least a first and a second work zone, wherein the first work zone and the second work zone are both comprised in the work area,
wherein the method comprises:
detecting an at least partial crossing of the first guide wire from the first work zone to the second work zone;
determining an operating status, the operating status indicating whether a crossing of the first guide wire to enter the second work zone is allowed, and if the operating status indicates that the crossing is allowed, allowing the robotic work tool to cross the first guide wire to the second work zone, and if not, controlling operation of the robotic work tool so that the first guide wire is not crossed; and
controlling operation of the robotic work tool to:
follow the second guide wire to search for the first guide wire,
follow the second guide wire during a crossing of the first guide wire,
stop following the second guide wire as the first guide wire has been crossed, or
only allow a crossing of the first guide wire when the robotic work tool is following the second guide wire.

16. A computer readable medium for carrying computer instructions that when loaded into a controller of the robotic working tool, causes the robotic working tool to operate according to the method according to claim 15.

* * * * *